Dec. 27, 1949     R. GILLIS     2,492,568
ELECTRICAL CONDUCTOR CABLES AND
A METHOD OF MAKING CABLES
Filed Jan. 28, 1947
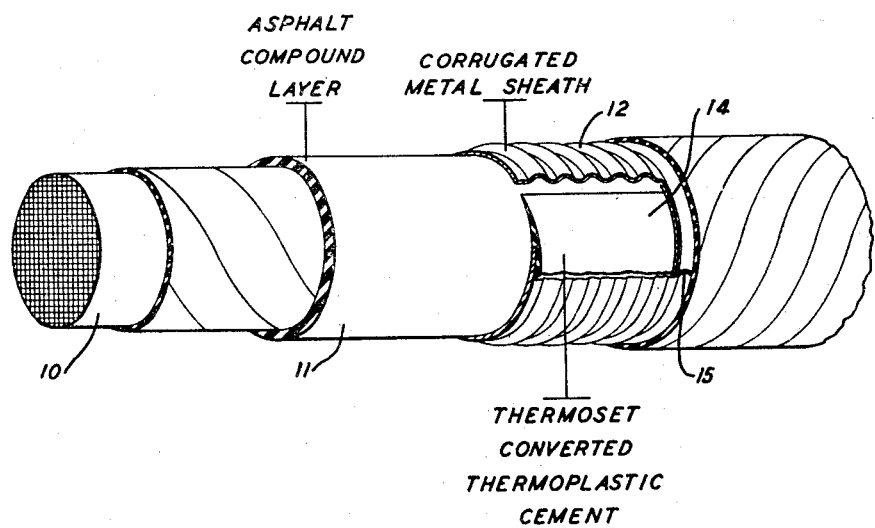
INVENTOR
R. GILLIS
BY
ATTORNEY Patented Dec. 27, 1949

2,492,568

UNITED STATES PATENT OFFICE 2,492,568

ELECTRICAL CONDUCTOR CABLES AND A METHOD OF MAKING CABLES

Randall Gillis, Snyder, N. Y., assignor to Western Electric Company, Incorporated, New York, N. Y., a corporation of New York Application January 28, 1947, Serial No. 724,843

8 Claims. (Cl. 174—102)

This invention relates to electrical conductor cables and a method of making cables, and more particularly to electrical conductor cables having a thin metal tape longitudinally folded about the core and to a method of hermetically sealing the seam of the metal tape.

Multiconductor cables particularly for installation out of doors either suspended in open air or in underground conduits or buried in the ground, have generally been made with a seamless moistureproof and mechanically protective sheath of lead or suitable lead alloy extruded over the cable core. Such sheaths are generally satisfactory in every way except for the weight and bulk of the usually necessarily rather massive lead sheath and, in recent years, except for the scarcity and cost of lead. Consequently attempts have been and are being made with more or less success to manufacture such cables having analogous sheaths of lighter, harder and thinner members of such metals as copper, brass, aluminum and others, applied over the core in the form of transversely corrugated tapes wrapped longitudinally about the core with overlapped edges forming a seam which must then be hermetically sealed in a manner to be mechanically strong and impervious to moisture. Soldering gives a satisfactory closure for the seam, but is a tediously and time consumingly slow procedure if perfect closure of the seam is to be accomplished with certainty.

An object of the present invention is to provide a cable structure and a method of making a cable which will provide a cable having a thin corrugated tape folded longitudinally about the cable core with the seam thereof hermetically and mechanically strongly sealed in a simple and reliable manner.

With the above and other objects in view the invention may be illustratively embodied in a method of making a cable which method comprises steps of flooding a strip along one lateral edge of a metal tape with cementitious material comprising as principal ingredient a thermoplastic polymeric synthetic resin capable of being cured to be thermosetting by addition of a suitable agent, applying to the surface of the cement a condensation product of a phenol and an aldehyde as agent to cause the resin to become thermosetting, folding the tape longitudinally of itself about a cable core with the flooded lateral edge of the tape overlapped by the other edge thereof, squeezing the overlapping edge portion of the tape down firmly upon the cementitious material upon the other edge portion of the tape, and applying heat to the overlap while maintaining the pressure thereon until the thermoplastic cementitious material has become thermosetting and has become firmly set.

Alternatively the invention may be illustratively embodied in an electric cable having a core, the combination with the core of a metal tape folded longitudinally of itself about the core as a sheath therefor and with one lateral edge of the tape overlapping the other, and a layer of cured cementitious material interposed between the overlapped edges of the tape to secure the same together, the said cementitious material comprising an originally thermoplastic polymeric synthetic resin as principal ingredient and cured to be thermosetting and set with a condensation product of a phenol and an aldehyde.

Other objects and features of the invention will appear from the following detailed description of one embodiment thereof taken in connection with the accompanying drawing in which the single figure represents diagrammatically a portion of a cable manufactured in accordance with the invention.

In carrying out the invention as herein disclosed a suitable length of cable core 10, which may be a bundle of parallel or of mutually intertwisted, individually insulated conductive wires with or without auxiliary inner sheathings or wrappings, is preferably provided with an inner sheath 11 of suitable thermoplastic composition, e. g. a mixture of rosin, rosin oil, polyisobutylene, asphalt and mineral oil of suitable consistency. This inner sheath may be applied over the inner core in any suitable manner, perhaps most simply by extrusion. However, the details of the structure of the core over which the corrugated metal tape 12 is to be folded are no part of the invention: it is merely generally preferable to have a core presenting a smooth outer surface.

The inner surface of the corrugated metal tape 12, is preferably flooded, prior to closing the tape about the core, with a thermoplastic material 14 of such nature that it can be converted into a thermosetting material by the addition thereto of a suitable curing agent. There are, commercially available in the market under various tradenames, various materials and curing agents of this character. Thus a mixture whose characterizing and principal ingredient is polyvinyl butyral combined with inert fillers, plasticizers, etc. in smaller amounts. is obtainable which is characteristically thermoplastic, but which by the addition of semi-cured phenol formaldehyde or similar thermosetting resin, takes on the property of becoming itself thermosetting when the mixture plus the curing agent is heated, especially under pressure. Another thermoplastic commercial mixture, also curable with a phenol formaldehyde agent, has polyvinyl acetal as its principal and characterizing ingredient. Still another is based on the polyamide commercially known as nylon, (a polymeric diamide of a dicarboxylic acid) and a fourth has the artificial rubber Buna N, the condensation product of butadiene and acrylonitrile, as its characteristic base, both these latter being curable with a phenol formaldehyde agent.

The inner surface of the tape 12 is preferably flooded with a more or less fluid melt of, say, the polyvinyl butyral thermoplastic, without curing agent, and is preliminarily formed about the core, so that the seam 15 between the overlapped edges is not yet closed. The curing agent, a suitable aldehydic condensation with a suitable phenolic compound, is then added to only that part of the thermoplastic coating on the metal tape which will come to lie between the overlapped edges of the tape. The tape is then finally folded shut with the overlap seam of its edges filled with the thermoplastic material plus curing agent, and the seam is held closed under pressure while heat is applied to effect or hasten the curing of the material in the seam, i. e. the conversion of this portion only of the thermoplastic layer 14 from thermoplastic into set thermosetting substance. Preferably the pressure is held until the converted and set material is cooled. It will then be found that the seam is satisfactorily, firmly and impermeably cemented and that this cemented seam will endure satisfactorily and successfully the bending tests, the temperature range tests and the permeability tests required of cable intended for outdoor communications service.

What is claimed is:

1. In an electric cable having a core, the combination with the core of a metal tape folded longitudinally of itself as a sheath about the core with one lateral edge of the tape overlapping the other and a layer of composition over the entire inner surface of the tape between the tape and the core and between the inner face of the overlap of the tape and the outer face of the underlap of the tape, the said composition consisting principally of a thermoplastic synthetic resin over the whole layer, and the portion thereof interposed between the overlap and underlap of the tape being cured to be thermosetting and set with a condensation product of a phenol and an aldehyde.

2. In an electric cable having a core, the combination with the core of a metal tape folded longitudinally of itself as a sheath about the core with one lateral edge of the tape overlapping the other and a layer of composition over the entire inner surface of the tape between the tape and the core and between the inner face of the overlap of the tape and the outer face of the underlap of the tape, the said composition consisting principally of a polymeric diamide of dicarboxylic acid resin over the whole layer, and the portion thereof interposed between the overlap and underlap of the tape being cured to be thermosetting and set with a phenol formaldehyde condensate.

3. In an electric cable having a core, the combination with the core of a metal tape folded longitudinally of itself as a sheath about the core with one lateral edge of the tape overlapping the other and a layer of composition over the entire inner surface of the tape between the tape and the core and between the inner face of the overlap of the tape and the outer face of the underlap of the tape, the said composition consisting principally of polyvinyl butyral resin over the whole layer, and the portion thereof interposed between the overlap and underlap of the tape being cured to be thermosetting and set with a condensation product of a phenol and an aldehyde.

4. In an electric cable having a core, the combination with the core of a metal tape folded longitudinally of itself as a sheath about the core with one lateral edge of the tape overlapping the other and a layer of composition over the entire inner surface of the tape between the tape and the core and between the inner face of the overlap of the tape and the outer face of the underlap of the tape, the said composition consisting principally of polyvinyl acetal resin over the whole layer, and the portion thereof interposed between the overlap and underlap of the tape being cured to be thermosetting and set with a condensation product of a phenol and an aldehyde.

5. The method of making a cable which method comprises steps of coating one side of a metal tape with cementitious material consisting principally of a thermoplastic polymeric synthetic resin capable of being cured to be thermosetting by addition of a phenol formaldehyde condensate, folding the tape longitudinally of itself about a cable core as a sheath therefor, applying a phenol formaldehyde condensate to the longitudinal strip portion only of the coating between the overlapped edges of the tape, and pressing the overlapped edges of the tape together on the core and applying heat thereto to cure the condensate treated thermoplastic resin to be thermosetting and to set the same as a permanent adhesive seal for the seam in the metal tape sheath about the core.

6. The method of making a cable which method comprises steps of coating one side of a metal tape with cementitious material consisting principally of a thermoplastic polymeric diamide of a carboxylic acid resin capable of being cured to be thermosetting by addition of a phenol formaldehyde condensate, folding the tape longitudinally of itself about a cable core as a sheath therefor, applying a phenol formaldehyde condensate to the longitudinal strip portion only of the coating between the overlapped edges of the tape, and pressing the overlapped edges of the tape together on the core and applying heat thereto to cure the condensate treated thermoplastic resin to be thermosetting and to set the same as a permanent adhesive seal for the seam in the metal tape sheath about the core.

7. The method of making a cable which method comprises steps of coating one side of a metal tape with cementitious material consisting principally of a thermoplastic polyvinyl butyral resin capable of being cured to be thermosetting by addition of a phenol formaldehyde condensate, folding the tape longitudinally of itself about a cable core as a sheath therefor, applying a phenol formaldehyde condensate to the longitudinal strip portion only of the coating between the overlapped edges of the tape, and pressing the overlapped edges of the tape together on the core and applying heat thereto to cure the condensate treated thermoplastic resin to be thermosetting and to set the same as a permanent adhesive seal for the seam in the metal tape sheath about the core.

8. The method of making a cable which method comprises steps of coating one side of a metal tape with cementitious material consisting principally of a thermoplastic polyvinyl acetal resin capable of being cured to be thermosetting by addition of a phenol formaldehyde condensate, folding the tape longitudinally of itself about a cable core as a sheath therefor, applying a phenol formaldehyde condensate to the longitudinal strip portion only of the coating between the overlapped edges of the tape, and pressing the overlapped edges of the tape together on the core and applying heat thereto to cure the condensate treated thermoplastic resin to be thermosetting and to set the same as a permanent adhesive seal for the seam in the metal tape sheath about the core.

RANDALL GILLIS.

REFERENCES CITED

The following references are of record in the file of this patent:

UNITED STATES PATENTS

| Number | Name | Date |
|---|---|---|
| 403,262 | Garland | May 14, 1889 |
| 2,121,942 | Barrett | June 28, 1938 |
| 2,216,435 | Eckel | Oct. 1, 1940 |
| 2,307,588 | Jackson | Jan. 5, 1943 |
| 2,376,854 | Saunders | May 22, 1945 |
| 2,396,098 | Haas | Mar. 5, 1946 |